United States Patent [19]

Clark et al.

[11] 4,018,086

[45] Apr. 19, 1977

[54] SYSTEM FOR MAINTAINING A DIESEL ENGINE

[75] Inventors: Gary E. Clark; Art J. Miller, both of Chicago, Ill.

[73] Assignee: Sun Electric Corporation, Chicago, Ill.

[22] Filed: Apr. 5, 1976

[21] Appl. No.: 673,389

Related U.S. Application Data

[62] Division of Ser. No. 619,463, Oct. 3, 1975, Pat. No. 3,978,721.

[52] U.S. Cl. .............................. 73/119 A; 285/176

[51] Int. Cl.[2] ........................................ G01M 15/00

[58] Field of Search ......... 73/119 A, 420; 137/315; 285/176, 197

[56] References Cited

UNITED STATES PATENTS

| | | | |
|---|---|---|---|
| 3,511,088 | 8/1968 | Weaver | 73/119 A |
| 3,874,225 | 4/1975 | Fegel | 73/119 A X |

*Primary Examiner*—Jerry W. Myracle

*Attorney, Agent, or Firm*—Allegretti, Newitt, Witcoff & McAndrews

[57] ABSTRACT

A system for maintaining a diesel engine is disclosed herein. The system includes a timing light and tachometer.

4 Claims, 3 Drawing Figures

SYSTEM FOR MAINTAINING A DIESEL ENGINE

This is a division of application Ser. No. 619,463, filed Oct. 3, 1975, now U.S. Pat. No. 3,978.721.

BACKGROUND OF THE INVENTION

The present invention relates generally to a system for maintaining a diesel engine and more particularly to a diesel engine timing light and tachometer.

It is well known that the performance of the diesel engine is highly dependent upon the fuel injection system. The fuel injection system, which basically includes a pump, fuel line and injector,regulates fuel distribution and timing thereof.

Presently, the fuel injection system of a diesel engine is maintained by disassemblage of the system to inspect and test the component parts. The process is particularly time-consuming and expensive.

SUMMARY OF THE INVENTION

In a principal aspect, the present invention is a system for maintaining a diesel engine. The system, in its broadest aspect, is a fuel injection timing light to verify that fuel delivery to the cylinders occurs at the proper degree of crankshaft rotation.

The system includes transducer means coupled to the fuel injection line, amplifier means, first pulse generating means, control means and visual output means. The transducer output is an electrical signal correlated to the fuel pressure wave within the fuel injection line, caused by action of the fuel pump.Whenever the electrical signal exceeds a trigger threshold, the amplifier means produces a trigger pulse, which trips the first pulse generating means and initiates production of a first timing pulse. Responsive to the first timing pulse, the visual output means produces a visual pulse utilized to properly set the fuel injection. The duration of the first timing pulse is adjusted and regulated by the control means in accordance with engine speed, to substantially avoid false triggering of the visual output means due to pressure reflections in the fuel line.

In another aspect, the present invention is an improved means for coupling a transducer to the fuel injection line of a diesel engine. The coupling means includes a fuel line retaining nut, adapter and transducer boss. The retaining nut is adapted to receive the fuel injection line. The adapter, mounted on the discharge port of the fuel pump, receives the retaining nut and transducer boss. The retaining nut causes the fuel line and discharge port to sealinglyseat against the transducer boss. The transducer,secured to the external end of the transducer boss, communicates with the fuel injection line through a pressure channel.

It is thus an object of the present invention to provide a system for maintaining a diesel engine.

It is a further object of the present invention to provide a diesel maintenance system including a timing light.

It is also an object of the present invention to provide a diesel maintenance system for visual display of the fuel pressure signature.

It is still another object of the present invention to provide a diesel maintenance system including a tachometer.

It is another object of the present invention to provide a diesel engine timing system wherein false triggering, due to pressure reflection in the fuel line, is substantially avoided.

It is also an object of the present invention to provide a diesel maintenance system which is readily and inexpensively manufactured.

It is yet another object of the present invention to provide an improved means for coupling a transducer to the fuel injection line of a diesel engine.

It is still another object of the present invention to provide an improved coupling means which is readily mountable on or incorporated into a diesel engine.

It is a further object of the present invention to provide an improved coupling means for a transducer which is readily and inexpensively manufactured.

These and other objects, features and advantages of the present invention will become apparent in the following detailed description.

BRIEF DESCRIPTION OF THE DRAWING

A preferred embodiment of the present invention will be described, in detail, with reference to the drawing wherein.

DESCRIPTION OF A PREFERRED EMBODIMENT

Figure 1:
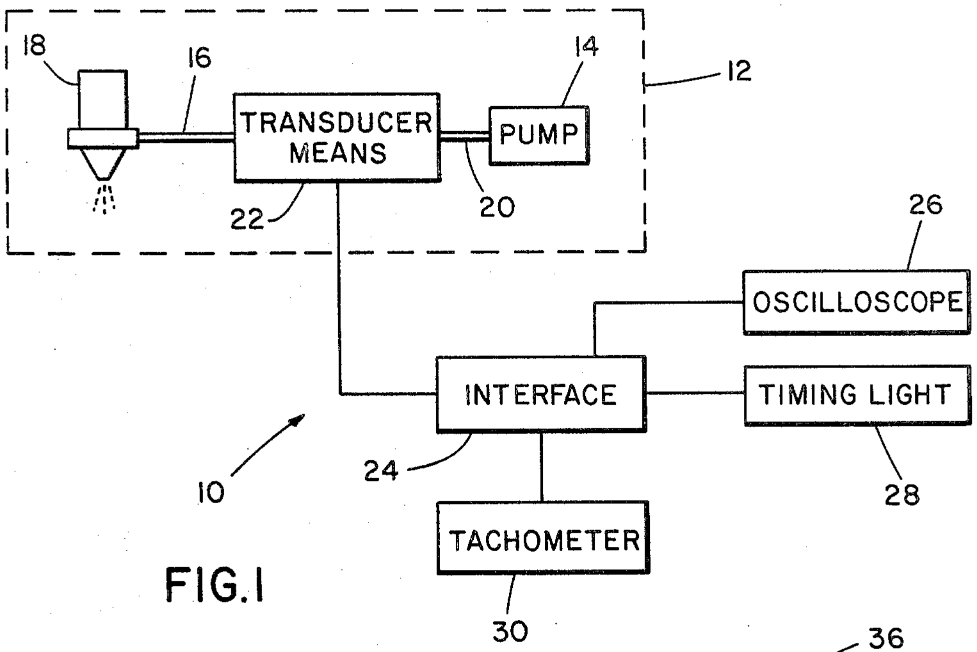
FIG. 1 is a schematic diagram illustrating a preferred embodiment of the present invention.

Referring to FIG. 1, a preferred embodiment of the present invention is shown as a system 10 for maintaining a diesel engine, generally designated 12, having a fuel pump 14, fuel injection line 16 and fuel injector 18. The fuel pump 14 has a discharge port 20. For purposes of illustration and clarity, only a single injector 18 is shown in FIG. 1; it is to be understood, however , that the diesel engine 12 includes an injector 18 for each cylinder therein.

The system 10 generally includes transducer means 22, interface 24, oscilloscope 26, timing light 28 and tachometer 30. As shown, the transducer means 22 is connected to the oscilloscope 26, timing light 28 and tachometer 30 through the interface 24, as described, in detail, below.

Figure 2:
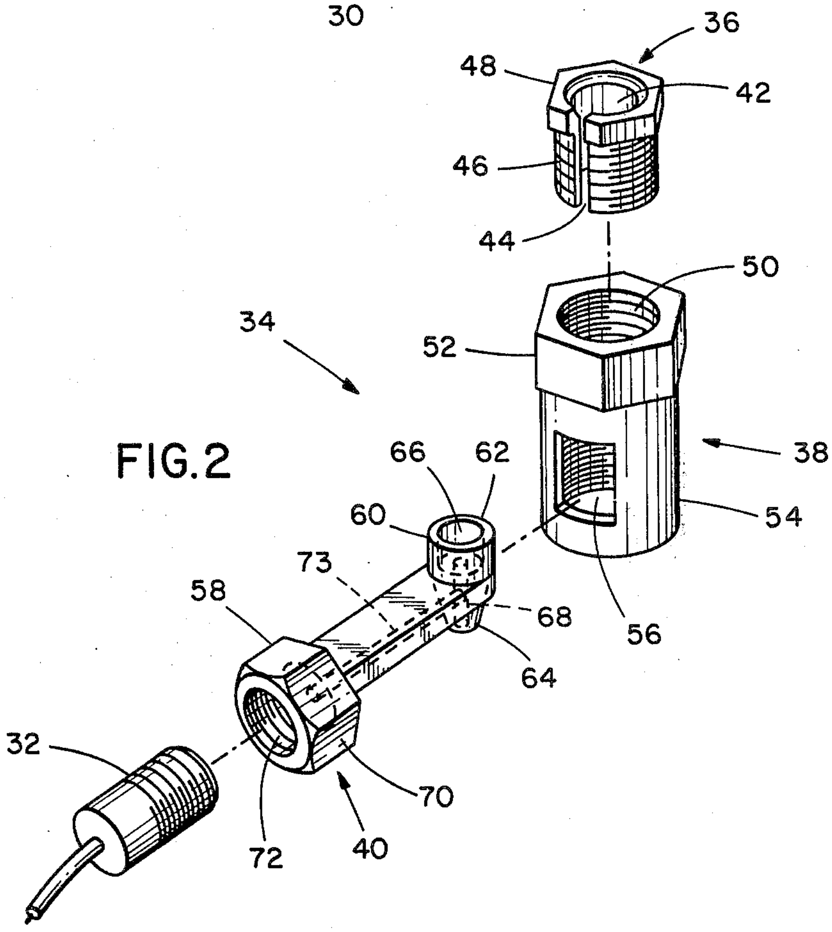
FIG. 2 is a perspective view of a transducer coupling for use in the preferred embodiment shown in FIG. 1.

The transducer means 22 produces a voltage signal in response and correlated to the fuel pressure wave in the fuel injection line 16. Referring to FIGS. 1 and 2, the transducer means 22 includes a transducer 32 and means 34 for coupling the transducer 32 to the fuel injection line 16. Preferably, the couple is made at the discharge port 20 of the fuel pump 14.

With particular reference to FIG. 2, the coupling means 34 includes an injection line retaining nut 36, adapter 38 and transducer boss 40. As shown, the retaining nut 36 defines a longitudinal passage 42 therethrough and a longitudinal slot 44 over the length thereof. The retaining nut 36 is adapted to receive the fuel injection line 16 within the longitudinal passage 42. The longitudinal slot 44 facilitates receipt and insertion.

One end 46 of the retaining nut 36 is externally threaded. The other end 48 is substantially hexagonal to facilitate assembly. At the hexagonal end 48, the longitudinal passage 42 flares outwardly in a substantially conical fashion, such that a fuel injection line 16 having a close bend radius can be accommodated.

The adapter 38 also defines a longitudinal passage 50 therethrough. The adapter 38 is internally threaded to receive, at a first end 52, the retaining nut 36 and injection line 16 and, at a second end 54, the discharge port 20 of the fuel pump 14. The first end 52 is substantially hexagonal; the second end 54 is substantially cylindrical. The length of the longitudinal passage 50 is minimized to substantially avoid "dead space" effect.

The adapter 38 defines an opening 56, in the second end 54, adapted to receive the transducer boss 40 in an assembled state. As shown, the transducer boss 40 includes an external end 58, adaptive to securingly receive the transducer 32, and an internal end 60. The internal end 60 defines a fuel injection line seat 62 and a pump discharge seat 64 which provide a substantially sealed couple.

More particularly, the retaining nut 36, in the assembled state, urges the injection line 16 and discharge port 20 against the line seat 62 and pump seat 64, respectively. Fuel passes through a pair of passages 66, 68 extending between the seats 62, 64.

The external end 58 of the transducer boss 40 defines a transducer cavity 70 and the interior wall 72 is threaded. The transducer cavity 70 and passage 68 communicate through a pressure channel 73 extending therebetween.

The transducer 32 senses the fuel pressure wave through the pressure channel 73 and generates an electrical voltage signal in response thereto. A suitable transducer 32 for use in this preferred embodiment of the present invention is manufactured by IC Transducer, Inc., under Model No. 750–001. Basically, a diaphragm (not shown) is deflected by the fuel pressure wave causing a resistive change in the transducer 32 proportional to the force applied to the diaphragm, thereby producing the correlated electrical signal.

Figure 3:
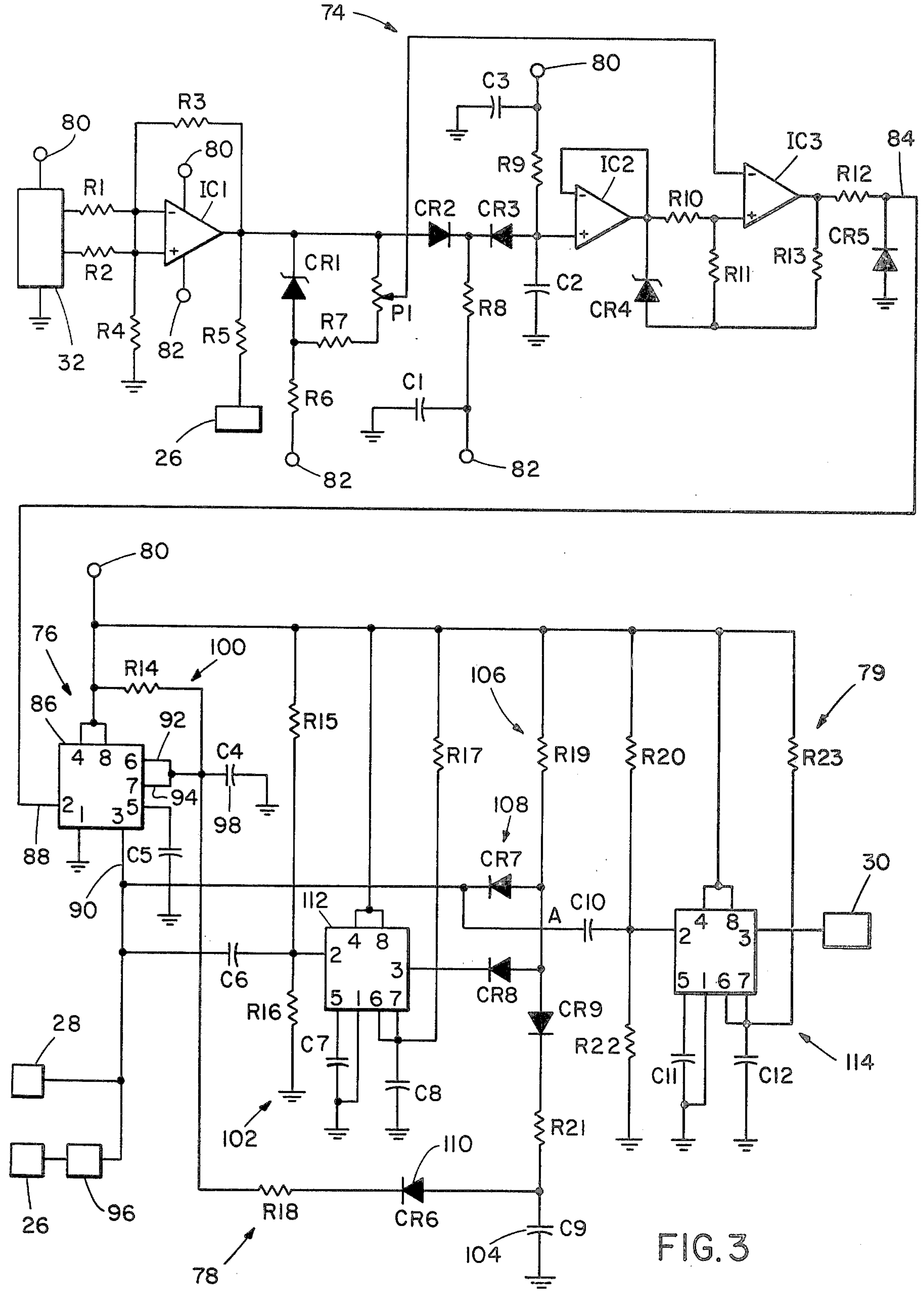
FIG. 3 is an electrical schematic diagram of the preferred embodiment shown in FIG. 1.

Referring now to FIG. 3, the interface 24 basically includes amplifier means 74, first pulse generating means 76, control means 78 for regulating the first pulse generating means 76 and output means 79. As shown, the system 10 is powered by plus and minus 12 volt supplies 80, 82, respectively.

The amplifier means 74, having an output 84, receives the signal generated by the transducer 32 and produces a trigger pulse whenever the transducer signal exceeds a trigger threshold. The amplifier means 74 includes amplifiers IC1–IC3, resistors R1–R13, potentiometer P1, capacitors C1–C3, and diodes CR1–CR5, interconnected as shown.

The amplifier IC1 is an operational amplifier, which converts the differential transducer signal to a single-ended signal. The single-ended signal is also amplified.

The oscilloscope 26 is connected to the output of the amplifier IC1 for visual display of the fuel pressure waveform. This display permits diagnosis of mechanical problems, such as a defective injector, a worn pump bearing or a worn pump plunger, and timing problems, without disassemblage of the injection system.

The resistors R8, R9, capacitor C2 and diodes CR2, CR3 form a slew-rate limiting circuit, whereby the maximum current through the capacitor C2 is regulated. As such, the voltage on the capacitor C2 approximates the integral of the output voltage of the amplifier IC1, except for rapid deviations. That is, rapid deviations of major size (such as peaks) are, for practical purposes, suppressed in terms of changing the capacitor C2.

The voltage on the capacitor C2 represents the residual pressure level in the injection line 16, as sensed by the transducer 32, and any offset resulting from transducer 32 and amplifier IC1. As shown, the capacitor C2 is connected to an input terminal of the amplifier IC3 through the amplifier IC2, a high impedance buffer operating at unity gain.

The amplifier IC3 acts as a comparator. The second input terminal thereof is connected to the center arm of the potentiometer P1. A positive signal at the output of the amplifier IC1, sufficient to render the center arm of the potentiometer P1 positive with respect to the voltage on the capacitor C2, causes the amplifier IC3 to switch, thereby providing the trigger pulse. That is, the output voltage of the amplifier IC3 becomes negative. The diode CR5 clips the negative output to maintain an acceptable level.

The voltage on the capacitor C2 and the voltage at the center arm of the potentiometer P1 determine the trigger threshold for the amplifier means 74. That is, the voltages thereon determine the magnitude of transducer voltage, as amplified by the amplifier IC1, required a produce the trigger pulse.

Comparison of the pressure signature and its integral substantially avoids the noise commonly experienced with a differentiator. Further, the amplifier IC3 will produce a trigger signal only in response to a rapidly changing pressure peak, as the voltage on the capacitor C2 will be changed in respose to a slowly changing pressure.

Referring again to FIG. 3, the trigger pulse is received by the first pulse generating means 76. The first pulse generating means 76 includes a 555 timing circuit 86 and a capacitor C5, connected as shown. The first pulse generating means 76 and, more particularly, the timing circuit 86 have an input terminal 88, output terminal 90, control terminal 92 and discharge terminal 94. A suitable 555 timing circuit 86 is manufactured by National Semiconductor Corp., under Model No. LM555C; it is to be understood, however, that any circuitry having performance characteristics as herein described is acceptable.

As shown, the output terminal 90 of the first pulse generating means 76 is connected to the oscilloscope 26, through inversion and level matching circuitry, schematically shown at 96, and the timing light 28. Responsive to the trigger pulse, the first pulse generating means 26 initiates a first timing pulse at the output terminal 90. The first timing pulse activates the timing light 28 to produce a visual or light pulse; the oscilloscope 26 is sweep-triggered by the first timing pulse or displays the first timing pulse in conjunction with the fuel pressure waveform.

First voltage storage means 98, i.e., capacitor C4, is connected to the control and discharge terminals 92, 94. The capacitor C4 is also connected to the supply 80 through resistor R14, which cooperatively define first charging means 100.

The first pulse generating means 76 resets and terminates the first timing pulse, whenever the capacitor C4 charges to a predetermined termination threshold. In this preferred embodiment, the termination threshold is approximately 8 volts. The control terminal 92 is grounded through the discharge terminal 94 during the reset period.

The duration of the first timing pulse effectively sets the time period between pressure pulses which will be accepted by the first pulse generating means 76 as valid. Once the first timing pulse is initiated, the first pulse generating means 76 is effectively inoperative with respective to the timing light 28 and tachometer 30, as described below, until termination thereof or reset. That is, during durationof the first timing pulse, pressure peaks sensed by the transducer 32 are substantially ignored. Thus,the first pulse generating means 76 substantially avoids false triggering or activation of the timing light 28 and tachometer 30, due to pressure reflections in the fuel injection line 16, by defining a minimum period between pressure pulses representing actual fuel injection.

In this preferred embodiment, the pulse duration, and determined by the resistor R14 and capacitor C4, is 45 milliseconds. This period corresponds to the duration of reflections of substantial amplitude after an injection.

The control means 78 regulates the duration of the first timing pulse in accordance with the speed of the diesel engine 12. Duration and speed are inversely proportinal. The control means 78 controllably charges the capacitor C4, as engine speed increases, to decrease the duration of the first timing pulse, i.e., the period between acceptable pressure peaks.

The control means 78 includes second pulse generating means 102, second voltage storage means 104, i.e., capacitor C9, second charging means 106 including supply 80 and resistors R19, R21, first controllably conductive means, generally designated 108, and second controllably conductive means 110, i.e., diode CR6. The control means also includes resistors R15, R16, R18 and capacitor C6, interconnected as shown.

The second pulse generating means 102, including a 555 timing circuit 112 and capacitor C7, produces a second timing pulse of fixed duration as determined by the resistor R17 and capacitor C8. The second timing pulse is preferably approximately 5 milliseconds. The second pulse generating means 102 is triggered by the trailing or termination edge of the first timing pulse, received through the capacitor C6. If the output of either the first or second pulse generating means 76, 102 is ground, then the common point A between the diodes CR7–CR9, which cooperatively define the first controllably conductive means 108, is approximately 0.7 volts and only a negligible current flows through the diode CR9 into the capacitor C9.Thus, under normal operation, i.e. when the engine speed and duration of the first timing pulse are correlated, the diode CR6 is reverse biased and resetting of the first pulse generating means 76 is controlled substantially by the resistor R14 and capacitor C4.

Triggering of the first pulse generating means 76 during duration of the second timing pulse, such that the first and second timing pulses overlap and indicating an increased RPM, reverse biases the diodes CR7, CR8, such that charging means 106 charges the capacitor C9. Whenever the voltage on the capacitor C9 exceeds the voltage on the capacitor C4, the diode CR6 is forward biased, and control means 78 assists in charging the capacitor C4 to appropriately decrease the duration of the first timing pulse.

The attack time of the control means 78 is determined by the resistors R19, R21 and capacitor C9. These components are chosen to provide a rapid charging of the capacitor C9 with respect to the rate of charge in engine speed. The relaxation time, determined by the resistor R18 and capacitor C9, is relatively long, on the order of several seconds, due to pump deactivation upon deceleration.

In this preferred embodiment, regulation of the first timing pulse by the control means 78 does not occur below approximately 2,400 RPM engine speed, as a result of the preferred durations. That is, overlap of the first and second timing pulses is substantiallyavoided below an engine speed of 2,400 RPM.

Output means 79 includes a third pulse generating means 114, having related components including resistors R20–23 and capacitors C10–12, interconnected as shown. Responsive to the first pulse generating means 76, the third pulse generating means 114 drives the tachometer 30 by production of fixed duration pulses, whose time-average voltage is proportional to engine speed.

A single preferred embodiment of the present invention has been described and disclosed herein. It is to be understood, however, that various modifications and changes can be made without departing from the true scope and spirit of the present invention, as set forth and defined in the following claims.

What is claimed is:

1. Means for coupling a transducer and a diesel engine including a fuel pump and a fuel injection line, said fuel pump having a discharge port, comprising in combination:

a retaining nut adapted to receive said fuel injection line therein;

an adapter having a first and second end, said first end being adapted to securingly receive said discharge port of said fuel pump, said second end being adapted to receive said retaining nut and said fuel injection line, said first end defining an opening, and a transducer boss having an external end adapted to receive said transducer and an internal end, said opening being adapted to receive said internal end in an assembled state, said internal end defining a fuel line seat and a discharge port seat for substantially sealing said coupling means to said fuel pump and said fuel injection line in said assembled state, said retaining nut urging said fuel injection line and said discharge port against said fuel line seat and said discharge port seat, respectively, said transducer boss defining a communicating channel between said external and internal ends.

2. Coupling means as claimed in claim 1 wherein said adapter is internally threaded

3. Coupling means as claimed in claim 1 wherein said first end of said adapter is substantially hexagonal to facilitate assembly.

4. Coupling means as claimed in claim 1 wherein said retaining nut defines a longitudinal slot to facilitate receipt of said fuel injection line.

* * * * *